(12) United States Patent
Guy et al.

(10) Patent No.: US 6,937,841 B1
(45) Date of Patent: Aug. 30, 2005

(54) REMOTE COMMUNICATION SYSTEM AND METHOD

(75) Inventors: Frederick R. Guy, 500 S. Warren St., Syracuse, NY (US) 13202; Ronald N. Roberts, Cochecton, NY (US)

(73) Assignee: Frederick R. Guy, Syracuse, NY (US)

( * ) Notice: Subject to any disclaimer, the term of this patent is extended or adjusted under 35 U.S.C. 154(b) by 0 days.

(21) Appl. No.: 09/185,703

(22) Filed: Nov. 4, 1998

Related U.S. Application Data

(63) Continuation of application No. 08/590,640, filed on Jan. 24, 1996, now Pat. No. 5,833,468.

(51) Int. Cl.[7] .............................. G09B 3/00; G09B 5/08
(52) U.S. Cl. .................. 434/350; 434/118; 434/307 R; 434/362; 348/13
(58) Field of Search .......................... 434/118, 307 R, 434/308, 323, 350, 362, 365; 345/1.1, 1.2, 345/2.1–2.3, 717; 725/74, 86, 105, 114, 133, 725/141, 153, 78, 136; 340/552; 709/236

(56) References Cited

U.S. PATENT DOCUMENTS

| | | |
|---|---|---|
| 4,415,774 A | 11/1983 | Driver |
| 4,715,818 A | 12/1987 | Shapiro et al. |
| 4,780,757 A | 10/1988 | Bryer et al. |
| 4,785,472 A | 11/1988 | Shapiro |
| 4,793,813 A | 12/1988 | Bitzer et al. |
| 4,837,800 A | 6/1989 | Freeburg et al. |
| 5,002,491 A | 3/1991 | Abrahamson et al. |
| 5,025,314 A | 6/1991 | Tang et al. |
| 5,176,520 A | 1/1993 | Hamilton |
| 5,192,999 A | 3/1993 | Graczyk et al. |
| 5,200,822 A | 4/1993 | Bronfin et al. |
| 5,267,865 A | 12/1993 | Lee et al. |
| 5,283,638 A | 2/1994 | Engberg et al. |
| 5,295,836 A | 3/1994 | Ryu et al. |
| 5,303,042 A | 4/1994 | Lewis et al. |
| 5,310,349 A | 5/1994 | Daniels et al. |
| 5,318,450 A | 6/1994 | Carver |
| 5,375,160 A | 12/1994 | Guidon et al. |
| 5,385,475 A | 1/1995 | Sudman et al. |

(Continued)

FOREIGN PATENT DOCUMENTS

| | | |
|---|---|---|
| EP | 0 142 302 | 5/1985 |
| EP | 0 366 250 | 5/1990 |
| EP | 0 639 918 A1 | 2/1995 |
| WO | WO 95/28804 | 10/1995 |

OTHER PUBLICATIONS

En Technology Corporate Backgrounder, pp. 1–3, Jun. 2, 1995.

(Continued)

Primary Examiner—Joe H. Cheng
(74) Attorney, Agent, or Firm—Morgan & Finnegan LLP

(57) ABSTRACT

A remote learning system combines on-line service information and remote user information with a television signal designed to be received by students using multimedia personal computers. The combined signal is then transmitted to all of the students at their personal computers. At each personal computer, the received signal is separated into its component parts by a VBI modem for display or control on/of the personal computers. Each personal computer is capable of communicating back to a main server over a network such as a public telephone network. A broadcasting facility integrates the information transmitted over the network from a single student with the television signal.

79 Claims, 7 Drawing Sheets

U.S. PATENT DOCUMENTS

| | | | |
|---|---|---|---|
| 5,387,104 A | | 2/1995 | Corder |
| 5,458,494 A | | 10/1995 | Krohn et al. |
| 5,585,858 A | * | 12/1996 | Harper et al. ............... 348/485 |
| 5,590,360 A | | 12/1996 | Edwards |
| 5,604,542 A | * | 2/1997 | Dedrick ...................... 348/552 |
| 5,655,214 A | * | 8/1997 | Mullett ........................ 725/78 |
| 5,818,441 A | * | 10/1998 | Throckmorton et al. .... 345/717 |
| 6,064,420 A | * | 5/2000 | Harrison et al. ............ 725/136 |
| 6,141,693 A | * | 10/2000 | Perlman et al. ............. 709/236 |

OTHER PUBLICATIONS

"Linking Home Computer and TV," Malachi Lets TV Viewers Order Products, Data via Home Computer, p. 1-3, 1995.

En Technology Publication, Malachi Fact Sheet, pp. 1-2, Oct. 12, 1995.

McGarvey, "Television: Data Delivery Switches Channels," Inter@ctive Week, vol. 2, No. 11, Jun. 19, 1995.

Herbert, "PC Connection founders wed PC with TV," New Hampshire Business Review, vol. 17, No. 14, Jul. 7-20, 1995, pp. 1-2.

En Technology's "TV Enhancement System," Communications Daily, vol. 15, No. 121, Friday, Jun. 23, 1995.

Bulkeley, "En Technologys Inc's Device Would Rapidly Transmit Large File to PC-TV Link," The Wall Street Journal, Thursday, Jun. 15, 1995.

Carlile, "Tempe firm, Intel team up to send data via TV," The Arizona Republic, Saturday, May 6, 1995.

Magruder, "Skyway system' rides with TV signals to distribute data," Arizona Business Gazette, Jul. 13, 1995.

Wavephone Press Release, "Wavephore Develops Datacasting System for Television Azteca in Mexico," Aug. 8, 1995.

Wavephone Press Release, "Wavephone and Arizona State University Launch Distance Learning Service," Aug. 17, 1995.

Wavephone Press Release, "Wavephore and GEC Plessey Semiconductors Enter into Alliance for Multimedia Chipset Development," Oct. 5, 1995.

Wavephone Press Release, "Intel and Waveform Sign Technology and Investment Agreement," May 5, 1995.

Wavephone Press Release, "FCC Proposed to Allow Digital Data Transmission With the Video Portion of TV Broadcasts, in Response to WavePhore's Request," Apr. 25, 1995.

Deagon, "Technology Offers TV Broadcasters an Avenue into Interactive Services," Investor's Business Daily, Monday, Apr. 19, 1993.

Wavephone Press Release, "Wavephore and Belcom Sign Agreement to Co-Develop Russian Data Broadcasting System," Sep. 10, 1995.

Wavephone Press Release, "Wavephore Unveils Windows-Based Wireless Multimedia Datacasting Software," Oct. 5, 1995.

Advertisement Brochure for TVT1/4 Video Broadcast Modem, 1994, five pages.

Opposition dated Jul. 30, 2003 filed against couterpart European Patent EP 0 958 569 entitled Remote Learning System (10 pages plus Annex I).

P. Glover, "CODE—A Ka Band VSAT System," Handout of the *IEE Colloquium on the Future of Ka Band for Satellite Communication*, held on Nov. 15, 1993.

Letter, dated Nov. 15, 1993, from G. Whitechurch to P. Glavin, Alleged in Opposition as Evidencing that P. Glover, CODE—A Ka Band VSAT System, Handout of the *IEE Colloquium on the Future of Ka Band for Satellite Communication*, held on Nov. 15, 1993, was made available to the public on Nov. 15, 1993.

Fairhurst et al., "Evaluation of the Protocols Within the Code Mesh VSAT Network", Proceedings of the IEE Colloquium on 'Networking Aspects of Small Terminal Satellite Systems' London, UK, Nov. 17, 1994.

A. Fernandez, Project Report on ETSIT—Tele-education Via Satellite, http://www.terena.nl/tech/archive/meps/node 2113.html, Date of entry: Sep. 16, 1994.

Patent Abstracts of Japan for Japanese Patent Application Publication No. 07123375A, published May 12, 1995, (Japanese Patent Application No. 05264597), "Character Graphic Transmission System," Matsushita Electrics Ind. Co. Ltd.

Ken Freed, Interactive TV Trade Reports, "When Cable Went Qubist," pp. 1-9 (2000), http://www.media-visions.com/itv-qube.html.

Mindy McAdams, "The Sad Story of Videotex," pp. 1-3 (1995), http://www.well.com/user/mmcadams/videotex.html.

Videotex definition, http://iml.jou.ufl.edu/carlson/professional/new_media/History/videotex.htm, 1 page, Copyright 1998-2000, David E. Carlson.

"AT&T Sceptre—a Videotex Terminal Introduced in 1983," CED in the History of Media Technology, pp. 1-2, http://www.cedmagic.com/history/sceptre.html. (1996).

* cited by examiner

REMOTE COMMUNICATION SYSTEM AND METHOD

This is a continuation of application Ser. No. 08/590,640, filed Jan. 24, 1996, now U.S. Pat. No. 5,833,468, which is incorporated herein by reference.

BACKGROUND OF THE INVENTION

1. Field of the Invention

The present invention describes a system which permits an instructor to teach one or more students at a site remote from the instructor.

2. Description of the Related Art

Instruction of students located in the same physical classroom as the instructor is an effective method of teaching because it allows a student to ask questions to both the instructor and the rest of her classmates. The instructor can give an immediate answer to the students, and can spontaneously ask additional questions of the students as the lecture progresses. In short, the instructor and the students can easily interact with each other concerning the topic of the lecture.

However, it is often necessary or desirable to teach students who for some reason are not able to meet in the same physical classroom. For example, students or instructors located at disparate physical locations may not be able to meet in one location or the number of students may be so large as to preclude fitting comfortably into one classroom. In these situations, distant or remote learning systems can advantageously be employed.

One approach to teaching students at remote sites, disclosed in U.S. Pat. No. 4,785,472, involves connecting a teaching station with a plurality of student stations over telephone lines. Both the teacher and the students have a prerecorded instructional tape and a video player to play the tape on. In operation, the instructor lectures, sends data to a computer, and controls on/off synchronization of the video players with commands sent over the telephone lines. In this manner, the instructor is able to lecture and periodically visually illustrate the lecture by showing the same section of multiple, identical video tapes to all of the students. This approach to remote learning has significant limitations caused by a need for (1) a constant telephone connection to the teaching site; (2) video segments for each session; and (3) a prepared video tape that must be distributed to each student before the lesson begins. Each of these requirements' for a conventional remote learning system has associated costs, the most significant of which may be the telephone connection that must be connected for the complete lesson.

Another conventional approach to remote learning is to use personal computers outfitted with a modem such that all communication is over public telephone lines. This approach is initially advantageous because the setup cost is low; once in use, however, the phone connect time charges can be prohibitively expensive.

Additionally, it is presently difficult to send video signals with the limited bandwidth available with today's telephone lines and modems. Further, proposals to use wide bandwidth telephone lines for such video transmission will increase further the costs required to use such proposed systems.

SUMMARY OF THE INVENTION

It is therefore an object of the present invention to address the limitations of the prior art remote learning systems.

It is a further object of the present invention to provide a remote educational system that provides a visual and, when appropriate, audio presentation, for students, including, for example, pictures of the instructor while allowing the students to easily interact with the instructor and with each other.

It is a further object of the present invention to provide a remote educational system that is low in cost for the student, both in terms of the initial hardware and software required and in the day-to-day operation.

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims. To attain the advantages and in accordance with the purpose of the invention, as embodied and broadly described herein, the invention comprises a system for remote communication between a host and a client, comprising a host facility for integrating data to be supplied to the client into vertical blanking intervals of a television signal and broadcasting the integrated television signal. A client receives the broadcasted integrated television signal and separates the integrated television signal into a standard television signal and the to-be-supplied data. Finally, the client transmits information to the host facility by connecting to a network linked with the host facility.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and together with the description, serve to explain the principles of the invention. In the drawings.

Reference will now be made in detail to the present preferred embodiment of the invention, an example of which is illustrated in the accompanying drawings. Wherever possible, the same reference numbers will be used throughout the drawings to refer to the same or like parts.

DESCRIPTION OF THE PREFERRED EMBODIMENT

A remote, or distance learning system is disclosed which combines on-line service information with a television signal designed to be received by students using a multimedia personal computer. Each personal computer is capable of communicating back to a server over a network, such as a public telephone network. The broadcasting facility then integrates the information transmitted over the network from a single student with the television signal, such that all the personal computer users (e.g., students) can see the information without having to connect to the network. The server may also integrate information originating at the server for transmittal to the students' personal computers.

Figure 1:
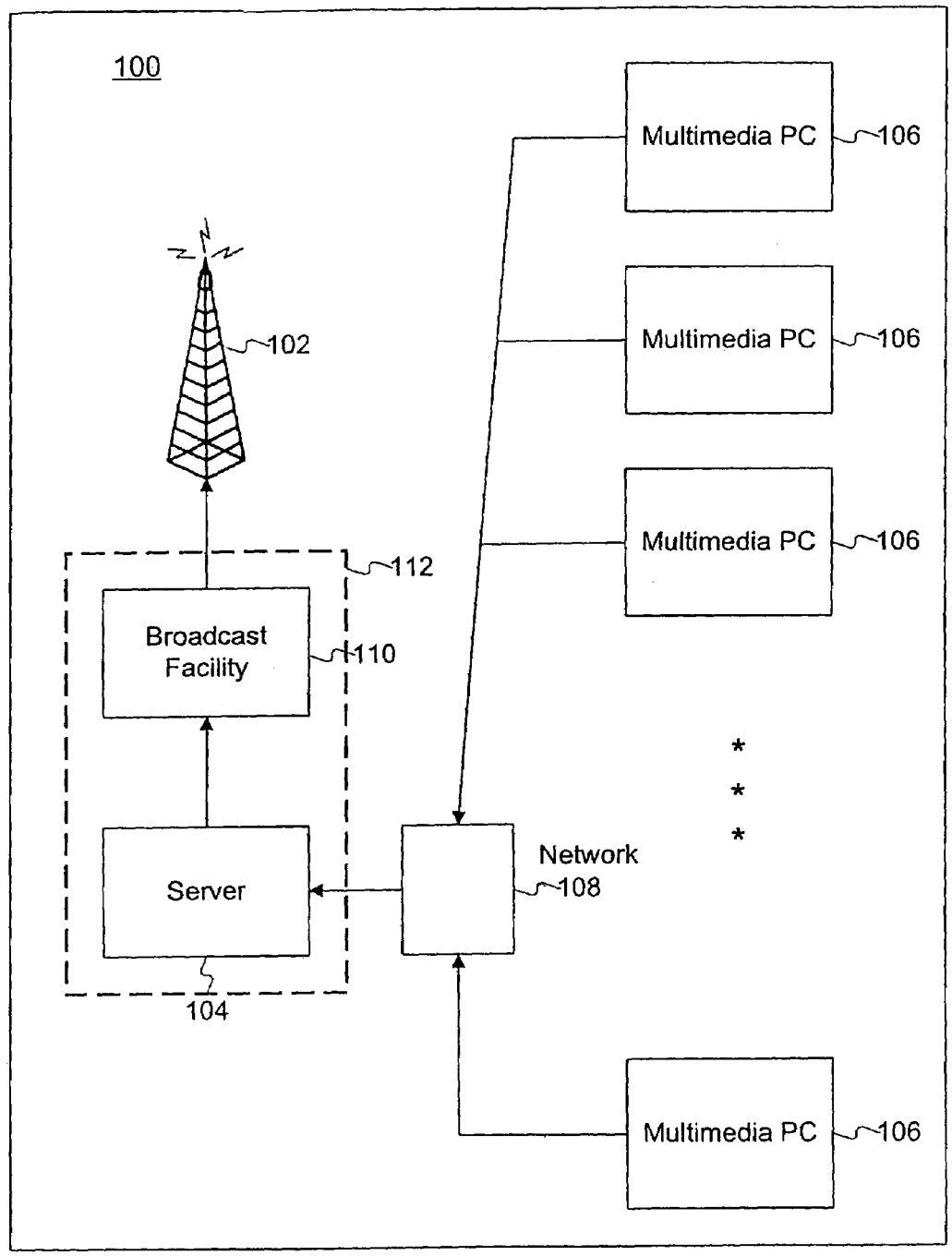
FIG. 1 is an illustration of the distance learning system according to an embodiment of the present invention.

In FIG. 1, the distance learning system (DLS) 100 according to the preferred embodiment comprises a broadcasting antenna 102 for broadcasting information, such as an instructional presentation, to a plurality of multimedia personal computers (PCs) 106 located at sites distant from the antenna 102. The antenna 102 could equivalently be replaced by a cable television link. A broadcasting facility 110, and server 104 are coupled to the antenna 102 and generate the signals to be broadcast by the antenna 102. A network 108, such as a public telephone network, is used to transmit data between the PCs 106 and the server 104. Although in the preferred embodiment the network 108 is a public telephone network, it could equivalently be any wide area network or combination thereof.

Figure 2:
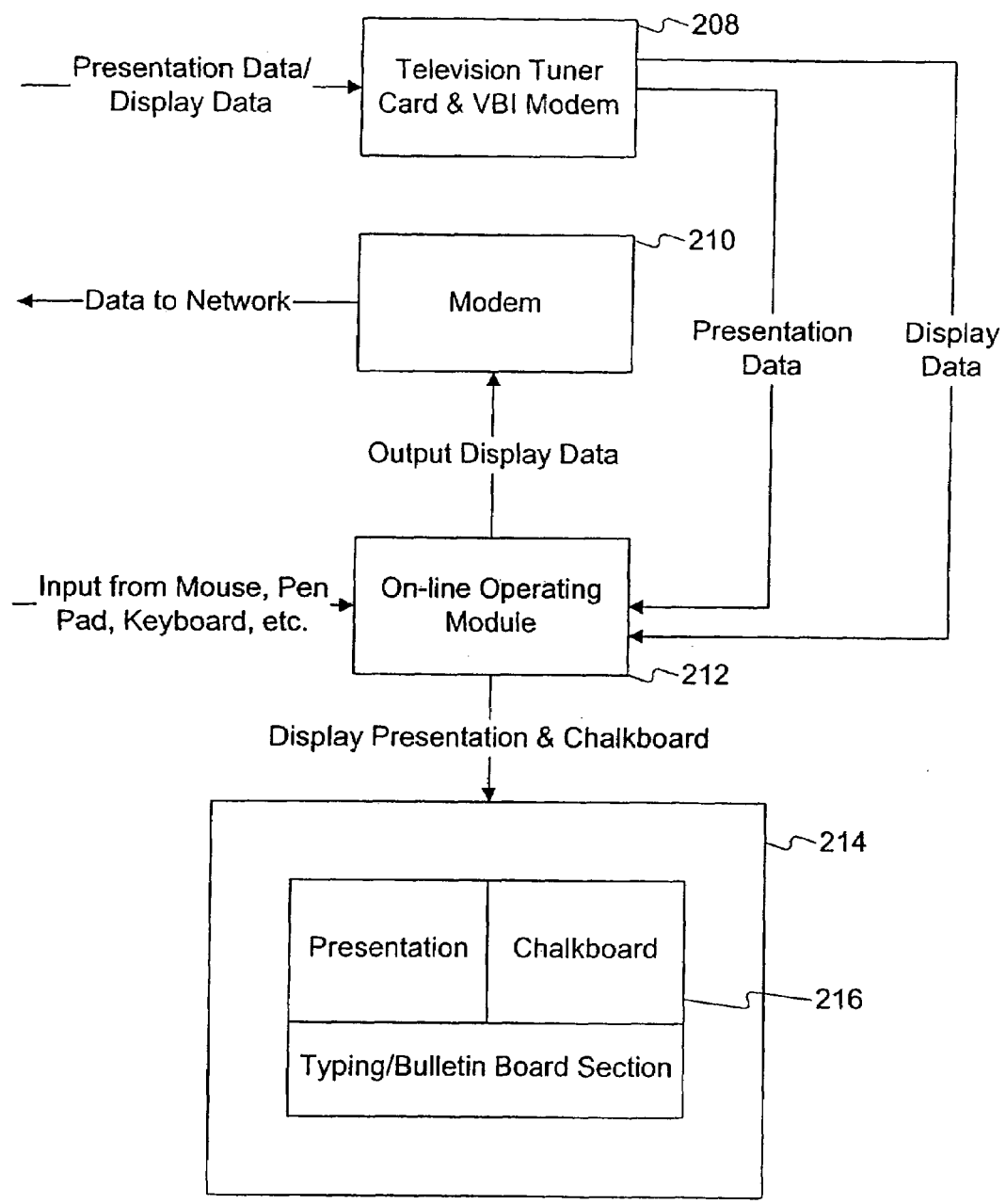
FIG. 2 is a block diagram of an exemplary multimedia PC as used in an embodiment of the present invention.

Reference will now be made to FIG. 2 to describe an exemplary embodiment of one of the PCs 106. Television tuner card/vertical blanking interval (VBI) modem 208 receives the television signal transmitted from the antenna 102. The television tuner card/VBI modem 208 may preferably be any of a number of suitable commercially available products, such as, for example, the Malachi, manufactured by En Technology Corporation. The television signal received at the tuner card/VBI modem 208 is provided to the on-line operating module 212 as presentation data and display data. Presentation data is the real-time audio-video data recorded by the instructor whereas display data is data that, for example, defines actions of the students. The on-line operating module 212 controls a modem 210 and display area 216 of the PC's monitor 214. Further, the on-line operating module 212 manages information input from the user of PC 106 using input devices such as a mouse, a pen writing tablet, or a keyboard.

Figure 5:
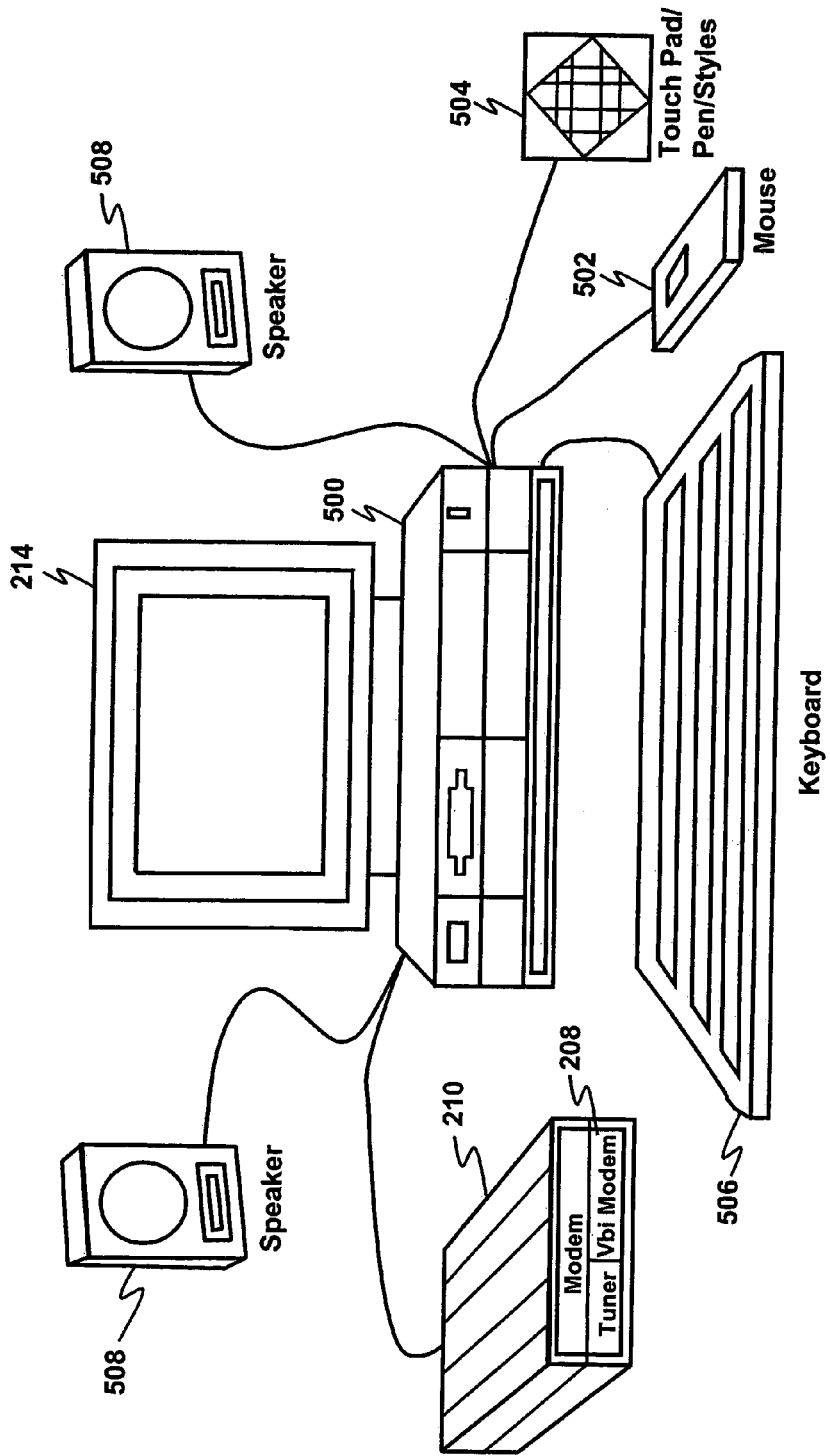
FIG. 5 illustrates one of the multimedia PCs used in an embodiment of the present invention.
Figure 6A:
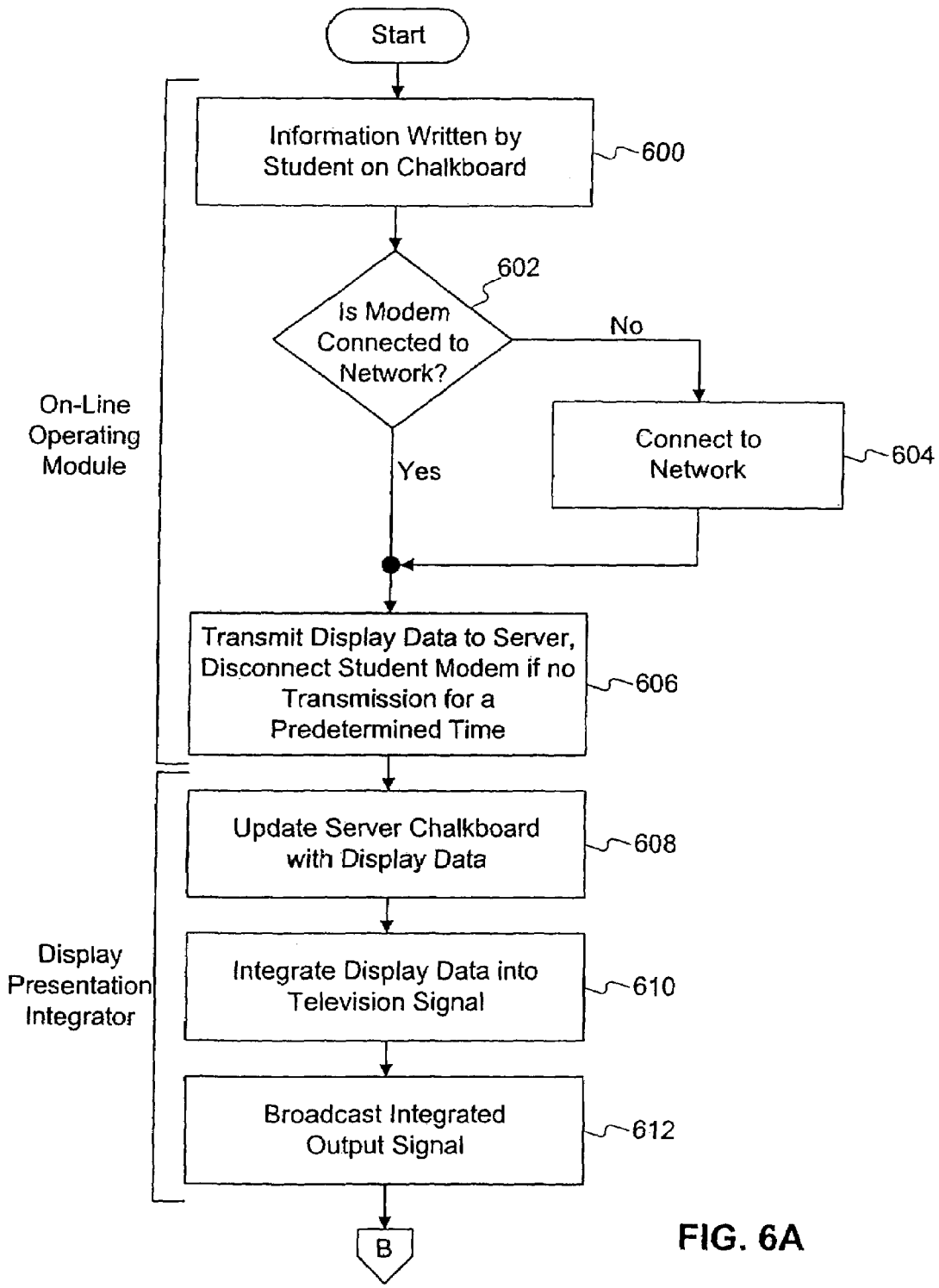
FIGS. 6A and 6B are a flow chart illustrating the system operation according to an embodiment of the present invention.
Figure 6B:
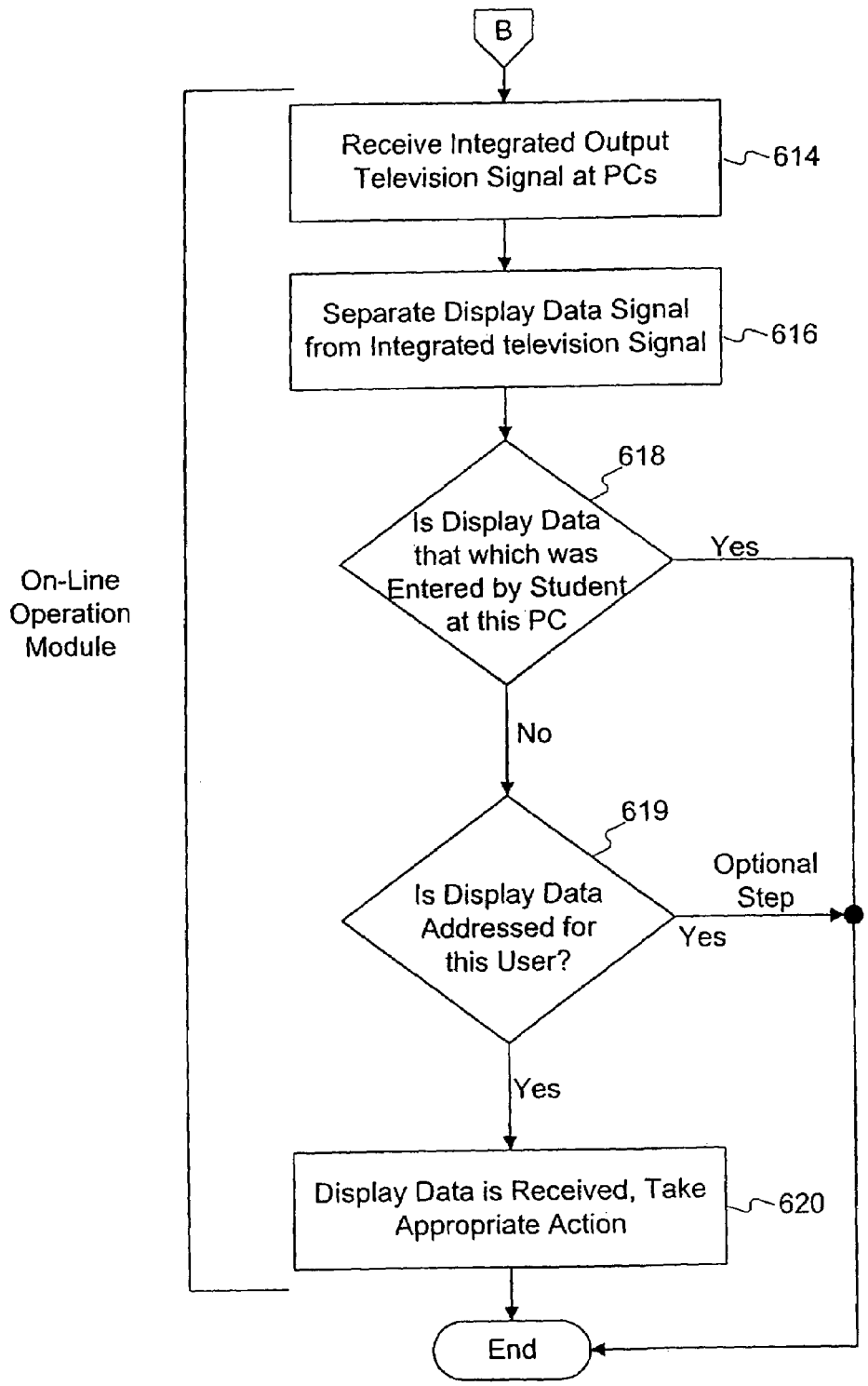

FIG. 5 illustrates an exemplary one of the multimedia PCs 106. In the preferred embodiment, PC 106 is a multimedia personal computer operating with the 80×86 compatible architecture and a graphical or windows based operating system. However, as would be recognized by one of ordinary skill in the art, many other suitable computer architectures and operating systems could be equivalently used.

PC housing 500 of PC 106 holds the majority of the PC's operating hardware. Housing 500 may hold, for example, the main processor, a hard disk drive, a floppy disk drive, fast access volatile memory, and CD ROM drive. Either connected to or integrated within housing 500 are a variety of input devices such as keyboard 506, mouse 502, and touch pad or pen writing tablet 504. PC 106 may also include speakers 508 and monitor 214, used to output audio and visual information, respectively. Modem 210, for sending or receiving digital data over phone lines, is electrically connected to housing 500. Television tuner/VBI modem 208, for receiving a modified standard television signal, is also electrically connected to housing 500. Both modem 210 and tuner/VBI modem 208 may alternately be implemented as computer (or printed circuit) boards installed within the housing 500.

The invention will be further clarified by the following operational description, which is intended to be exemplary of the invention. In a typical remote learning session according to the present invention, an instructor, located at the host site 112, teaches students, each located at one of the PCs 106. The lecture information in the form of an audio-visual feed from the instructor, called presentation data, is broadcast through a television signal by antenna 102 to the PCs 106. In addition to the presentation data, data to be used to control the on-line operating module 212, called display data, is embedded within the television signal being broadcast to the PCs 106. Frequently, the display data describes updates to be made to the students' displays.

Figure 3:
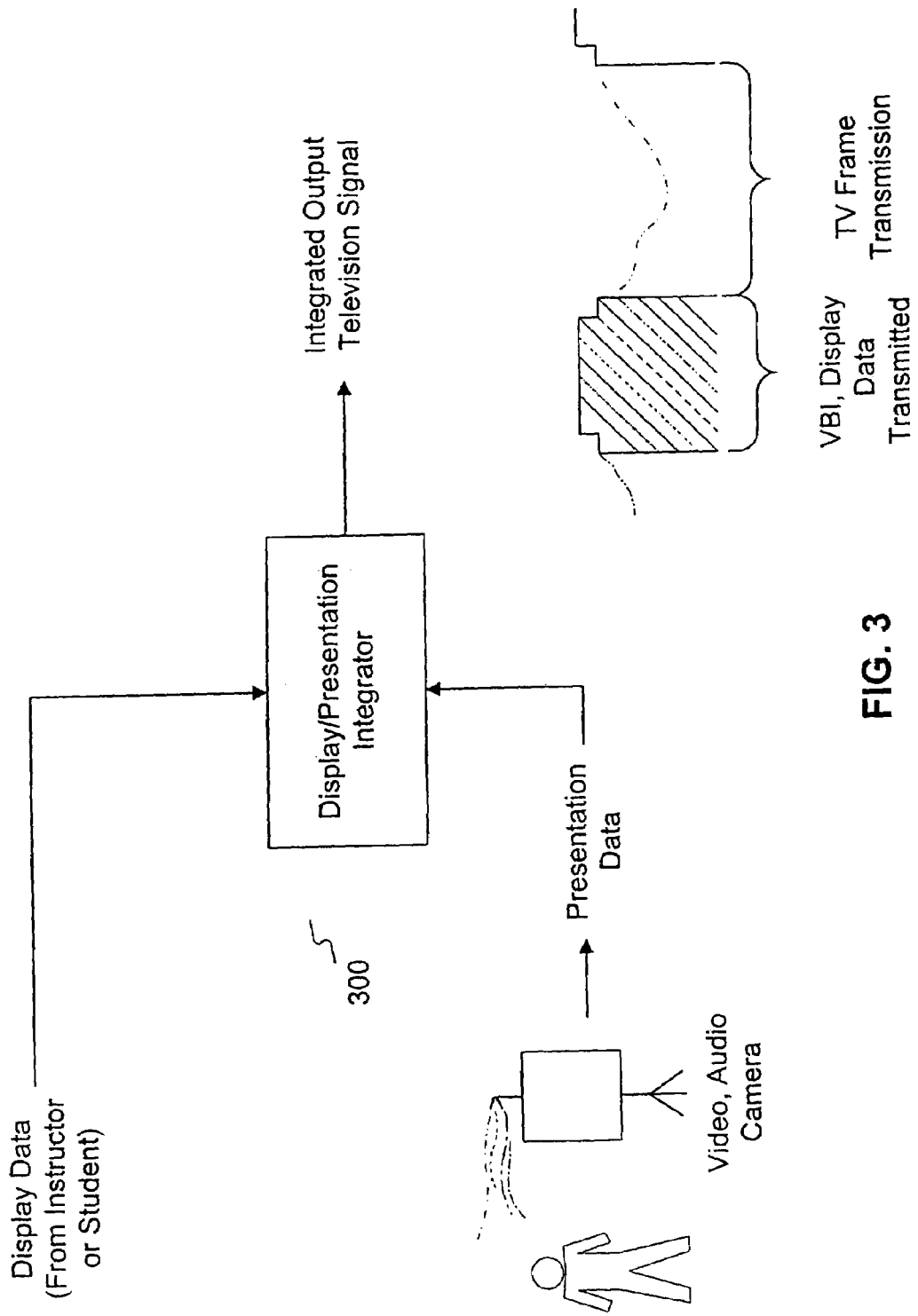
FIG. 3 is a diagram illustrating the integration of the display data and presentation data according to an embodiment of the present invention.

FIG. 3 illustrates the integration function of the presentation data with the display data, performed at the host 112. Presentation data to be integrated may include a live or taped audio-visual feed of the lecture. Display data to be integrated may include data entered by either the instructor or one of the students. Display data entered by a student is transmitted to the host 112 through network 108 using the student's modem 210 before it is integrated. The actual integration operation is performed by integrator 300, which receives the display data and presentation data and integrates them into a single output signal 302. The output signal 302 comprises a standard television signal of the presentation data modified by inserting the display data into the television signal's vertical blanking intervals. The output signal 302 is transmitted to the broadcasting facility 110 and antenna 102 for broadcasting to the PCs 106.

All the display data at the server does not have to be integrated by the integrator 300. Optionally, if the server is to send data to only one, or only a few students, and a live modem connection exists between those students, the server may send the display data directly over the live modem connection.

At each PC 106, tuner card/VBI modem 208 receives the transmitted output signal 302 and reads the display data from the vertical blanking interval of the television signal. The separated presentation and display data signals are then transferred to the on-line operating module 212.

The on-line operating module 212 manages the user interface 216 and transfers the output display data over modem 210 to server 104 via network 108. A typical display on the user interface 216 is shown in more detail in FIG. 4. The operation of the on-line operating module 212 in relation to FIG. 4 will be described next.

Figure 4:
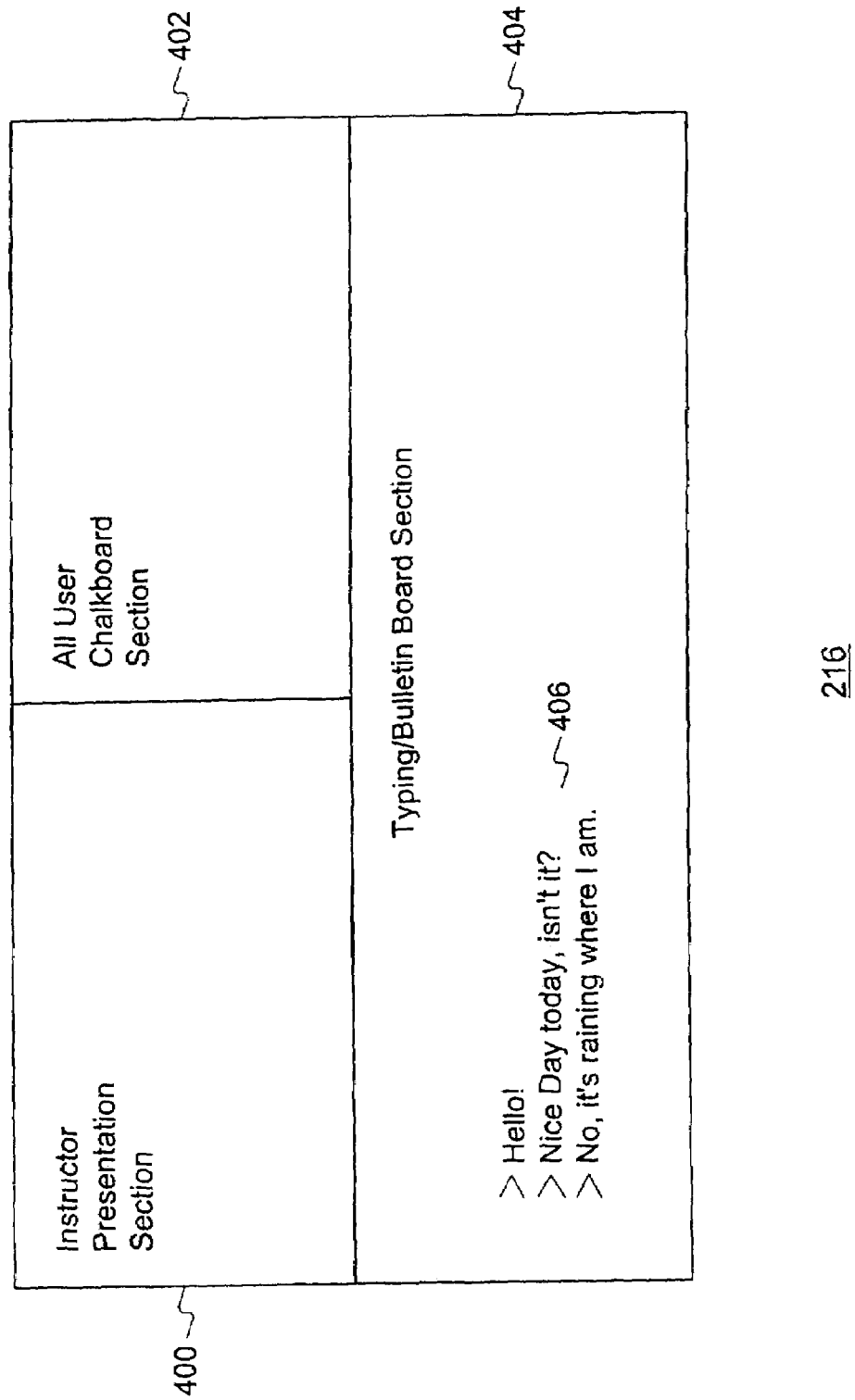
FIG. 4 is an exemplary display of the user interface presented by the software according to an embodiment of the present invention.

FIG. 4 is an exemplary display of the interface screen presented by the on-line operating module 212 to the user. A similar interface screen would be presented to the instructor at the host 112. The three main sections of the interface screen are the instructor presentation section 400, the chalkboard section 402, and the typing/bulletin board section 404.

In the instructor presentation section 400, a real-time rendering of the television presentation data is displayed. Typically, this would be a display of the instructor and/or his instructional materials during a lecture. An audio signal corresponding to the instructor's presentation may be simultaneously output to the speakers 508. The chalkboard section 402 is an interactive chalkboard that can be written on by either the instructor or the students. Typically, a computer mouse, touch pad, and/or pen writing pad is used to write on the chalkboard 402. Information written on the chalkboard 402 by the instructor is integrated into the television signal as display data at the host 212, by the integrator 300, and transmitted to the PCs 106, where it is subsequently separated by the tuner card/VBI modem 208 from the television signal and displayed on the students' chalkboards 402.

A flow chart of the decision sequence initiated when a student writes information to her chalkboard 402 for viewing by the instructor and the other students is shown in FIG.

6. When information is written on the chalkboard by the student, step 600, it is transmitted as display data by the student's modem 210 to the server 104 in step 606. If in step 602 it is determined that the modem is not connected to the public telephone network, step 604 is executed, connecting the modem 210 to the network. If a predetermined period of time elapses with no transmission by the modem and the software is in a "toll-saving" mode, modem 210 will automatically be disconnected from the telephone network. In the "toll-saving" mode, connections to the server are temporary and end after a predetermined period of time. If a connection has been ended and the student subsequently performs actions which require connection to the server, the client program transparently re-establishes the connection.

In step 608, the display data received by the server is written onto the server chalkboard. Next, the display data is integrated with the instructor television signal, step 610, and the integrated output signal 302 is broadcast, step 612. The integrated output signal 302 is then received at the students' PCs, step 614, and separated by the tuner/VBI modem 512 in step 616. The separated display data is received by the on-line operating module 212. Finally, the on-line operating module 212 judges whether the display data is the same display data that was previously entered and transmitted from the host PC. If it is not the same display data, the chalkboard 402 is updated with this new display data in step 620. If it is the same display data, the chalkboard 402 is not updated.

Although the above example was illustrated using a general broadcast of the display data, that is, the display data was received and displayed on all the PCs 106, more selective broadcasting functions can be utilized. In particular, the student or instructor writing on the chalkboard may elect for her message to be displayed on only a selected set of the other PCs. To do this, the user selects, preferably using a menu system, whom her message is to be sent to. This selection information is transmitted with the display data. At the receiving PC, an additional judgment is made at step 619, namely, the PC determines whether the message was addressed for display to that particular user. If it is determined that it was intended for that user, the message is displayed, otherwise, the message is ignored by the on-line operating module 212.

Typing/bulletin board section 216 of the user interface is used by the students and the instructor as an interactive "chat" area in which messages can be quickly typed and transmitted to other users. Here, after a line of text 406 is entered by a student or the instructor, it is converted into display data by the on-line operating module 212 and transmitted to the other users in the same manner that information entered on the chalkboard is transmitted. That is, the text is transmitted to the host 112, integrated into the television signal by the integrator 300, and broadcast to the PCs 106. Similar to the chalkboard information, a user may also address the messages sent to a limited set of users, allowing for more personal messages.

It will be apparent to those skilled in the art that various modifications and variations can be made in the embodiment of the present invention and in construction of this invention without departing from the scope or spirit of the invention. As an example, the disclosed invention is not limited to remote classroom instruction with an instructor lecturing to students. Indeed, a bulletin board and on-line service has been constructed using the concepts disclosed in the present invention. The bulletin board and on-line service transmits most of the general bullitin board data to the users using a high bandwidth, low reception cost signal such as a television signal. The users transmit their data using a lower bandwidth network such a public telephone network. Although all the users receive a single transmission signal from the bulletin board, the user's local software only displays the information intended for that user.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A system for remote communication, comprising:
   at least one host server that integrates data received from at least one of a plurality of client computers with a first signal to provide a signal for broadcasting such that the signal is capable of being received by the plurality of client computers; and
   from among said plurality of client computers, at least one client computer that receives the broadcast signal and separates the integrated data from the signal.

2. The system of claim 1, wherein each client computer includes a tuner card for separating the integrated data from the signal.

3. The system of claim 1, wherein each client computer includes a user interface for presenting the data integrated with the first signal one prompting a user to provide data to be sent to the host server.

4. The system of claim 3, wherein at least a portion of the data received by the host server from a client computer is addressed to another client computer.

5. The system of claim 4, wherein the addressing is specified by information provided in the data received by the host server from the client computer.

6. The system of claim 1, wherein the client computer comprises a display device for presenting information signals representing said integrated data.

7. A tangible computer-readable medium containing instructions for integrating a continuous signal of images and sounds with a data signal as a signal in a host server communicably connected to a broadcasting facility that transmits the signal such that the signal is capable of being received by a plurality of client facilities, the instructions operative in implementing a method comprising:
   receiving data defining actions of at least one of the plurality of client facilities; and
   combining the received data defining actions as at least a part of the signal that is transmitted by the broadcasting facility.

8. The computer-readable medium according to claim 7, wherein the method includes the capability of selectively addressing the received data defining actions of at least one of the plurality of client facilities to a specific one or more of the plurality of client facilities based on information provided in the received data.

9. A system for remote communication between a host facility and remote clients, the system comprising:
   a host facility that combines an audiovisual data stream with data originating at the host or with data received from another computer electronically connected to the host, or with both data originating at the host and data received from another computer electronically connected to the host, and which causes the combined signal to be sent for distribution via a broadcast signal, and
   clients that receive data from the broadcast signal and which intermittently transmit data to the host, the transmitted data being provided to the host such that the clients are capable of specifying at least a portion of the transmitted data as being intended for incorporation into the broadcast signal.

10. The system of claim 9, wherein the audio-visual stream represents an instructional presentation.

11. The system of claim 9, wherein data included in the signal broadcast by the host consists at least in part of downloads requested by the clients.

12. The system of claim 9, wherein data received by at least one of the clients is represented in a chat feature in real time.

13. The system of claim 9, wherein data received by at least one of the clients is presented as a text message.

14. The system of claim 9, wherein data received by at least one of the clients is graphically represented as handwriting.

15. The system of claim 9, wherein data received by at least one of the clients is represented as audio or as video or as both audio and video.

16. The system of claim 9, wherein video of the audio-visual data included in the broadcast signal and data included in the broadcast signal received by the clients is simultaneously displayed on the same display device of at least one of the clients.

17. The system of claim 9, wherein the at least one of then clients simultaneously receives the broadcasted data while sending data to the host.

18. The system of claim 9, wherein clients are capable of controlling in real time, by means of data sent via the broadcast signal, data displayed on other clients.

19. The system of claim 9, wherein the combined signal broadcasted by the host is used to deliver e-mail.

20. The method of claim 9, wherein the data received by the client generates a graphical representation on the display device of the client.

21. The system according to claim 9, wherein the transmitted data is provided to the host such that the clients are capable of selectively addressing the at least a portion of the transmitted data to a specific one or more of the clients that are capable of receiving the broadcast signal.

22. A method for providing remote communication between a host and a plurality of client devices, each of the client devices comprising a processor that executes a module that is operative in interfacing with the user to acquire information input by the user and in transferring data to the host, the method comprising:
receiving at the host data from at least one of said plurality of client devices that each employ its corresponding said module to send data in response to user input acquired by the module; and
providing at the host at least a portion of the received data into a signal provided for transmission to the plurality of client devices as a broadcast signal.

23. The method of claim 22, wherein said user input is capable of being initiated by the user independent of, and not in response to, signals received from the host.

24. The method of claim 22, wherein said broadcast signal is a television compatible signal.

25. The method according to claim 22, wherein the at least a portion of the received data that is provided into the signal provided for transmission is addressed to a specific one or more of said plurality of client devices.

26. The method according to claim 25, wherein the received data from the at least one of said plurality of client devices is selectively addressed to a specific one or more of the other of said plurality of client devices that receive the transmission of said broadcast signal.

27. The method according to claim 25, wherein the received data from the at least one of said plurality of client devices is from a given one of said plurality of client devices, and the at least a portion of the received data is selectively addressed only to said given one of said plurality of client devices that receive the transmission of said broadcast signal.

28. The method according to claim 25, wherein the addressing is specified according to information included in the corresponding data received by the host from the corresponding at least one of said plurality of client devices.

29. The method according to claim 22, wherein the received data from the at least one of said plurality of client devices represents information intended for all of said plurality of client devices that receive the transmission of said broadcast signal.

30. The method according to claim 22, wherein said signal provided for transmission includes one of or both (i) first data defining information intended for all of the plurality of client devices and (ii) second data defining in formation specific to selected one or more client devices of the plurality of client devices.

31. The method according to claim 22, wherein the method is implemented as a bulletin board system between the host and the plurality of client devices.

32. The method according to claim 31, wherein the method is implemented as an on-line communication service between the host and the plurality of client devices.

33. The method according to claim 22, wherein the method is implemented as a remote educational system.

34. The method according to claim 22, further comprising, by operation of the host, providing additional data into said signal such that the signal includes the at least a portion of the received data and the additional data, wherein the additional data is acquired from a source other than said plurality of client devices.

35. The method according to claim 34, wherein the additional data represents an educational presentation by an instructor.

36. The method according to claim 34, wherein the additional data represents control instructions for at least one of the plurality of client devices.

37. The method according to claim 34, wherein the additional data is recorded information accessed by the host.

38. The method according to claim 22, wherein the at least a portion of the received data controls information displayed on at least one display device respectively associated with at least one of the other plurality of client devices.

39. The method according to claim 22, wherein the host receives data from the plurality of client devices via a public network or via a private network or via a private network and a public network.

40. The method according to claim 22, wherein the signal is provided for transmission by broadcast through the atmosphere.

41. The method according to claim 40, wherein the signal is provided for transmission by broadcast over a cable network.

42. The method according to claim 22, wherein the signal is provided for transmission as a high bandwidth broadcast signal, and the data from the at least one of said plurality of client devices is intermittently received via a network having a bandwidth lower than the high bandwidth broadcast signal.

43. The method according to claim 22, wherein said signal includes video information for display at one or more of the plurality of client devices.

44. The method according to claim 22, wherein the signal is a television compatible signal that includes a video signal having a vertical blanking interval into which said at least a portion of the received data is integrated.

45. The method according to claims 22, wherein each of the plurality of client devices receives the transmission and extracts from the signal only any data intended for the particular client device and any data intended therefor.

46. The method of claim 22, wherein the broadcast signal is a high bandwidth point to multipoint signal.

47. A tangible computer-readable medium having computer-executable instructions for implementing the method of claim 22.

48. A system comprising at least one processor that implements the method of claim 22.

49. A host system for remote communication with a plurality of client devices that each comprise a processor that executes a module that is operative in interfacing with a user to acquire information input by the user and in transferring to the host system data representative of the information input by the user, the host system comprising at least one processor that receives from at least one of said plurality of client devices data representative of the information input by the user, and that is operative in providing at least a portion of the received data into a signal provided for transmission to the plurality of client devices as a broadcast signal.

50. The host system according to claim 49, wherein the host system comprises at least one server that includes the at least one processor of the host system.

51. The host system according to claim 49, wherein the received data from the at least one of said plurality of client devices is selectively addressed to a specific one or more client devices of said plurality of client devices that receive the transmission of said broadcast signal.

52. The host system according to claim 51, wherein the received data from the at least one of said plurality of client devices is from a given one of said plurality of client devices, and the at least a portion of the received data is selectively addressed only to said given one of said plurality of client devices that receive the transmission of said broadcast signal.

53. The method according to claim 51, wherein the addressing is specified according to information included in the corresponding data received by the host from the corresponding at least one of said plurality of client devices.

54. The host system according to claim 49, wherein the received data from the at least one of said plurality of client devices represents information intended for all of said plurality of client devices that receive the transmission of said broadcast signal.

55. The host system according to claim 49, wherein said signal includes one of or both (i) first data defining information intended for all of the plurality of client devices and (ii) second data defining information specific to selected one or more client devices of the plurality of client devices.

56. The host system according to claim 49, wherein the host system is implemented as a bulletin board system between the host system and the plurality of client devices.

57. The host system according to claim 56, wherein the host system is implemented as an on-line communication service between the host system and the plurality of client devices.

58. The host system according to claim 49, wherein the host system is implemented as a remote educational system.

59. The host system according to claim 49, wherein said at least one processor is operative in providing additional data into said signal, wherein the additional data is acquired from a source other than said plurality of client devices.

60. The host system according to claim 59, wherein the additional data represents an educational presentation by an instructor.

61. The host system according to claim 59, wherein the additional data represents control instructions for at least one of the plurality of client devices.

62. The host system according to claim 49, wherein the at least a portion of the received data controls information displayed on at least one display device respectively associated with at least one of the other plurality of client devices.

63. The host system according to claim 49, wherein the host system receives the data from the at least one of said plurality of client devices via a network, the network being a public network or a private network or including a private network and a public network.

64. The system according to claim 63, wherein the broadcast signal has a bandwidth greater than the bandwidth for receiving data from a given one of the plurality of client devices via the network.

65. The host system of claim 49, wherein the broadcast signal is a high bandwidth point to multipoint signal.

66. The host system according to claim 49, wherein the signal includes a video signal with which said at least a portion of the received data is combined.

67. The system according to claims 49, wherein each of the plurality of client devices receives the transmission of the broadcast signal and extracts from the signal only any data intended therefor.

68. A processor-implemented method for facilitating remote communication of a device with a host system, the method comprising:
providing an interface operative in acquiring information input by a user, and operative in displaying information transmitted by said host system as a broadcast signal; and
transferring to the host system via a network connection information representative of information input by the user via the user interface, the transferred information being provided to the host system such that at least a portion of the transferred information is capable of being specified for incorporation into the broadcast signal transmitted by the host system.

69. The method according to claim 68, further comprising processing the broadcast signal transmitted by said host system to extract information intended for the device only.

70. The method according to claim 69, wherein the information intended for the device only is received from said host system in response to information input by the user via the user interface.

71. The method according to claim 69, wherein the information intended for the device only is communicated to the host system via a network connection by another device associated with another user.

72. The method according to claim 68, wherein the broadcast signal includes common information for display by the device in communication with said host system.

73. The method according to claim 68, wherein the information transferred to the host system via the network connection in response to in formation input by the user via the user interface is information selectively addressed by the user for a specified one or more users associated with a respective one or more devices communicably connected to the host system.

74. The method according to claim 68, wherein the information transferred to the host system via the network connection in response to information input by the user via the user interface is information intended for all users associated with a respective devices to which the broadcast signal is transmitted.

75. The method according to claim 68, wherein the broadcast signal is a high bandwidth point to multipoint signal.

76. A tangible computer-readable medium comprising instructions for implementing the method of claim 68.

77. A device comprising a processor that implements the method of claim 68.

78. An interactive system for remote communication, the system comprising:
- a host facility that integrates a signal capable of containing images and audio with a separate data signal to generate a combined signal provided for transmission as a broadcast signal;
- a plurality of remote computers each capable of receiving the broadcast signal and each having a network interface device to selectively send data to the host facility via a network; and
- wherein the host facility receives via the network data defining actions from at least one of the plurality of computers and includes at least a portion of the received data as the separate data in the combined signal that is provided for transmission as the broadcast signal.

79. A method for providing remote communication between a host and a plurality of client facilities, the method comprising:
- broadcasting a signal to the plurality of client facilities, the signal capable of containing first data defining information intended for all of the plurality of client facilities and capable of containing second data defining information specific to selected ones of the plurality of client facilities;
- intermittently receiving data from at least one of the plurality of client facilities defining actions at said client facilities; and
- selectively integrating at least a portion of the received data into the signal as one of the first data or the second data for transmission to the plurality of client facilities.

* * * * *